(12) United States Patent
Chu

(10) Patent No.: US 11,347,232 B2
(45) Date of Patent: May 31, 2022

(54) MOBILE ROBOT

(71) Applicant: SHENZHEN SILVER STAR INTELLIGENT TECHNOLOGY CO., LTD., Shenzhen (CN)

(72) Inventor: Zhijun Chu, Shenzhen (CN)

(73) Assignee: SHENZHEN SILVER STAR INTELLIGENT TECHNOLOGY CO., LTD., Guangdong (CN)

(*) Notice: Subject to any disclaimer, the term of this patent is extended or adjusted under 35 U.S.C. 154(b) by 108 days.

(21) Appl. No.: 16/758,771

(22) PCT Filed: May 31, 2018

(86) PCT No.: PCT/CN2018/089390
§ 371 (c)(1),
(2) Date: Apr. 23, 2020

(87) PCT Pub. No.: WO2019/080500
PCT Pub. Date: May 2, 2019

(65) Prior Publication Data
US 2020/0257305 A1    Aug. 13, 2020

(30) Foreign Application Priority Data
Oct. 26, 2017 (CN) .......................... 201711012584.4

(51) Int. Cl.
*G05D 1/02* (2020.01)
*G01C 21/20* (2006.01)

(52) U.S. Cl.
CPC .......... *G05D 1/0231* (2013.01); *G01C 21/206* (2013.01)

(58) Field of Classification Search
CPC ............... G05D 1/0231; G05D 1/0242; G05D 2201/0215; G01C 21/206
See application file for complete search history.

(56) References Cited

U.S. PATENT DOCUMENTS 4,620,285 A * 10/1986 Perdue .................... G01S 15/86
                                                                                701/23
D548,902 S  *  8/2007 Chun .............................. D32/21
(Continued)

FOREIGN PATENT DOCUMENTS

CN      102488481 A      6/2012
CN      107175645 A      9/2017
(Continued)

OTHER PUBLICATIONS

English Machine Translation to Abstract of CN107608360.
(Continued)

*Primary Examiner* — Babar Sarwar
(74) *Attorney, Agent, or Firm* — Cantor Colburn LLP

(57) ABSTRACT

A mobile robot, including: a body, a drive system for driving the movement of the mobile robot, a light emitter for emitting light towards a detection face, a photoelectric sensor for responding to light coming from an environment and/or light emitted by the light emitter, an adjustable impedance unit connected to the photoelectric sensor, and a controller. The controller adjusts the adjustable impedance unit to form at least two types of gear values with different impedances and responds to, under the condition of each type of gear values, a sampling difference value determined when the light emitter is in a turn-on and a turn-OFF state, so as to prevent the generation of a misjudgment from causing the mobile robot to carry out an accidental action, such that the mobile robot can work in a special working environment with strong light exposure and a black light-absorption detection face.

20 Claims, 5 Drawing Sheets

(56) References Cited

U.S. PATENT DOCUMENTS

| | | | |
|---|---|---|---|
| 7,441,298 B2* | 10/2008 | Svendsen | A47L 9/009 15/49.1 |
| D658,341 S * | 4/2012 | Nam | D32/21 |
| D660,530 S * | 5/2012 | Geringer | D32/21 |
| D690,478 S * | 9/2013 | Li | D32/21 |
| 8,584,305 B2* | 11/2013 | Won | A47L 11/4013 15/319 |
| 8,741,013 B2* | 6/2014 | Swett | A47L 9/22 55/482 |
| 9,020,637 B2 | 4/2015 | Schnittman | |
| 9,931,007 B2* | 4/2018 | Morin | A47L 9/2857 |
| D835,869 S * | 12/2018 | Li | D32/21 |
| D843,671 S * | 3/2019 | Chei | D32/21 |
| 10,222,805 B2* | 3/2019 | Munich | B25J 5/007 |
| D870,994 S * | 12/2019 | Zhou | D32/21 |
| D872,953 S * | 1/2020 | Ebrahimi Afrouzi | D32/21 |
| D885,698 S * | 5/2020 | Li | D32/21 |
| D885,699 S * | 5/2020 | Li | D32/21 |
| 10,688,652 B2* | 6/2020 | Hummel | A47L 9/12 |
| 10,725,477 B2* | 7/2020 | Nan | G05D 1/0238 |
| 10,744,650 B2* | 8/2020 | Neumann | B25J 13/084 |
| D903,961 S * | 12/2020 | Li | D32/21 |
| D906,608 S * | 12/2020 | Li | D32/21 |
| 10,874,275 B2* | 12/2020 | Liggett | A47L 9/2852 |
| 10,912,433 B2* | 2/2021 | Song | A47L 11/162 |
| D932,123 S * | 9/2021 | Li | D32/21 |
| 2016/0206164 A1* | 7/2016 | Oka | A47L 9/2894 |
| 2017/0273528 A1* | 9/2017 | Watanabe | H04N 7/188 |
| 2019/0129034 A1* | 5/2019 | Yoshida | G01S 17/36 |

FOREIGN PATENT DOCUMENTS

| | | |
|---|---|---|
| CN | 107608360 A | 1/2018 |
| WO | 2017008454 A1 | 1/2017 |

OTHER PUBLICATIONS

English Machine Translation to Abstract of CN102488481.
English Machine Translation to Abstract of CN107175645.
International Search Report for International Application No. PCT/CN2018/089390.

* cited by examiner

MOBILE ROBOT

CROSS-REFERENCE TO RELATED APPLICATIONS

The present application is National Stage of PCT/CN2018/089390 filed on May 31, 2018, which claims priority to Chinese Patent application No.: 201711012584.4 filed on Oct. 26, 2017 with the State Intellectual Property Office of the People's Republic of China, and entitled "mobile robot", the contents each of which are incorporated herein by reference thereto.

TECHNICAL FIELD

The present application relates to the field of robotic detection technologies, and particularly to a mobile robot.

BACKGROUND

The existing mobile robotic ground detection systems and wall detection systems include at least a set of infrared emitting tube and infrared reception tube, the infrared emitting tube is used to emit infrared rays, and the infrared reception tube is used to receive the infrared rays. After the infrared rays emitted by the infrared emitting tube are reflected by the ground or the wall, part of the infrared rays is received by the infrared reception tube, and the strength of the presented signal is different when the intensity of the infrared rays received by the infrared reception tube is different. In the prior art, the infrared emitting tube is turned on for a period of time to collect a signal (denoted as X1) from the infrared reception tube, and then the infrared emitting tube is turned off for a period of time to collect a signal (denoted as X2) from the infrared reception tube, and a difference value (denoted as X3) between X1 and X2 is obtained such that X3 is compared with a preset threshold to determine which environment the mobile robot is in.

However, once the mobile robot is finalized, the sensitivity of the infrared reception tube is fixed, and it is difficult to ensure that the ground detection system and the wall detection system can work normally in three special environments, such as the ground or wall illuminated by strong light, the ground or wall with normal brightness, the floor covered with a black blanket, or the wall covered with a black light-absorbing material. In the ground or wall environment illuminated by strong light, no matter the infrared emitting tube is turned on or off, the infrared rays with a relatively high intensity will be received by the infrared reception tube due to an infrared component contained in the ambient light, so that the infrared reception tube is in a saturated state. In this state, there is almost no difference in the strength of X1 and X2, the mobile robot will wrongly determine the ground as a cliff, consequently making a risk-avoiding action; or the mobile robot is away from the wall and is unable to get close to the wall to perform the action such as cleaning or mopping or the like. In the environment where the ground is covered with the black blanket or the wall is covered with the black light-absorbing material, no matter the infrared emitting tube is turned on or off, most of the infrared rays emitted by the infrared emitting tube is absorbed by the black blanket or black material, and the mobile robot will be wrongly determined as facing a cliff or unable to get close to the wall since a small part of the infrared rays is not enough to cause a significant change in strength of the signal from the infrared reception tube.

SUMMARY

The technical problem solved by the present application lies in that: conventional ground detection systems and wall detection systems cannot work in a special working environment where the detection surface is illuminated by strong light or the black detection surface is provided with a property of light absorbing, thereby resulting erroneous determination. Based on this, a mobile robot is provided, which includes:

a body;

a drive system, connected to the body and configured to drive the mobile robot to move;

a light emitter, supported by the body and configured to emit light toward a detection surface;

a photoelectric sensor, supported by the body and configured to be responsive to light from environment and/or the light emitted by the light emitter;

an adjustable impedance unit, connected to the photoelectric sensor; and a controller, configured to adjust the adjustable impedance unit to form at least two setting values with different impedances, and to be responsive to a sampling difference value between sampling values determined while the light emitter is in an ON state and an OFF state under each of the setting values, such that the mobile robot is prevented from performing an unexpected action due to erroneous determination.

Alternatively, the controller is provided with: an impedance adjustment port connected to the adjustable impedance unit, a signal sampling port connected between the photoelectric sensor and the adjustable impedance unit, and a signal control port connected to the light emitter; the controller is configured to:

adjust the adjustable impedance unit by controlling the impedance adjustment port to form the at least two setting values with different impedances;

turn on and turn off the light emitter through controlling the signal control port under each of the setting values;

acquire a turned-on sampling value and a turned-off sampling value through the signal sampling port when the light emitter is in the ON state and in the OFF state;

be responsive to the at least two sampling difference values determined for the at least two setting values to prevent the mobile robot from performing an unexpected action due to the erroneous determination, wherein the sampling difference value is a difference value between the turned-on sampling value and the turned-off sampling value.

Alternatively, the controller is configured to:

acquire a plurality of turned-on sampling values through the signal sampling port when the light emitter is in the ON state, and acquire an average turned-on sampling value based on the plurality of turned-on sampling values;

acquire a plurality of turned-off sampling values through the signal sampling port when the light emitter is in the OFF state, and acquire an average turned-off sampling value based on the plurality of turned-off sampling values, wherein the sampling difference value is a difference value between the average turned-on sampling value and the average turned-off sampling value.

Alternatively, the light emitter is configured to emit infrared rays toward the detection surface, and the photoelectric sensor is responsive to infrared rays from environment and/or the infrared rays emitted by the light emitter.

Alternatively, the adjustable impedance unit includes a first resistor and at least one second resistor, one ends of the first resistor and the second resistor are connected to the photoelectric sensor, another end of the first resistor is grounded or connected to the controller, and another end of the second resistor is connected to the controller.

Alternatively, the controller is configured to be responsive to a comparison result between the sampling difference value determined while the light emitter is in the ON state and the OFF state and preset data, such that the mobile robot is prevented from performing an unexpected action due to the erroneous determination.

Alternatively, the preset data includes at least four sampling difference values acquired by placing the mobile robot in working environments provided with at least two different kinds of detection surfaces under each of the setting values.

Alternatively, the light emitter includes an infrared emission tube, a PNP transistor, and a current-limiting resistor, wherein a collector of the PNP transistor is connected to an anode of the infrared emission tube, and a cathode of the infrared emission tube is grounded; an emitter of the PNP transistor is connected to a driving power supply via the current-limiting resistor; a base of the PNP transistor is connected to the controller.

Alternatively, the light emitter includes an infrared emission tube, an NPN transistor, and a current-limiting resistor, wherein a collector of the NPN transistor is connected to a cathode of the infrared emission tube, and an anode of the infrared emission tube is connected to a driving power source via the current-limiting resistor; an emitter of the NPN transistor is grounded; a base of the NPN transistor is connected to the controller.

Alternatively, the light emitter and the photoelectric sensor are arranged in pairs at a bottom of the body, and the light emitter is configured to emit light towards ground.

Alternatively, the light emitter and the photoelectric sensor are arranged in pairs at an outer periphery of the body, and the light emitter is configured to emit light towards a wall.

The embodiments of the present application provides a mobile robot, which includes: a body, a drive system configured to drive the mobile robot to move, a light emitter configured to emit light toward a detection surface, a photoelectric sensor configured to be responsive to light from environment and/or the light emitted by the light emitter, an adjustable impedance unit connected to the photoelectric sensor, and a controller. The controller is configured to adjust the adjustable impedance unit to form at least two setting values with different impedances, and to be responsive to a sampling difference value between sampling values determined when the light emitter is in an ON state and an OFF state under each of the setting values, such that the mobile robot is prevented from performing an unexpected action due to erroneous determination, thereby realizing that the mobile robot can work in the special working environment where the detection surface is illuminated by strong light or the black detection surface is provided with a property of light absorbing.

DESCRIPTION OF THE DRAWINGS

In order to more clearly illustrate the embodiments of the present application or the technical solutions in the prior art, the drawings used in the embodiments will be briefly introduced below. Obviously, the drawings in the following description are just some embodiments of the present application, and other modifications may be obtained for those of ordinary skill in the art based on these drawings without paying creative labor.

DETAILED IMPLEMENTATIONS

Figure 1:
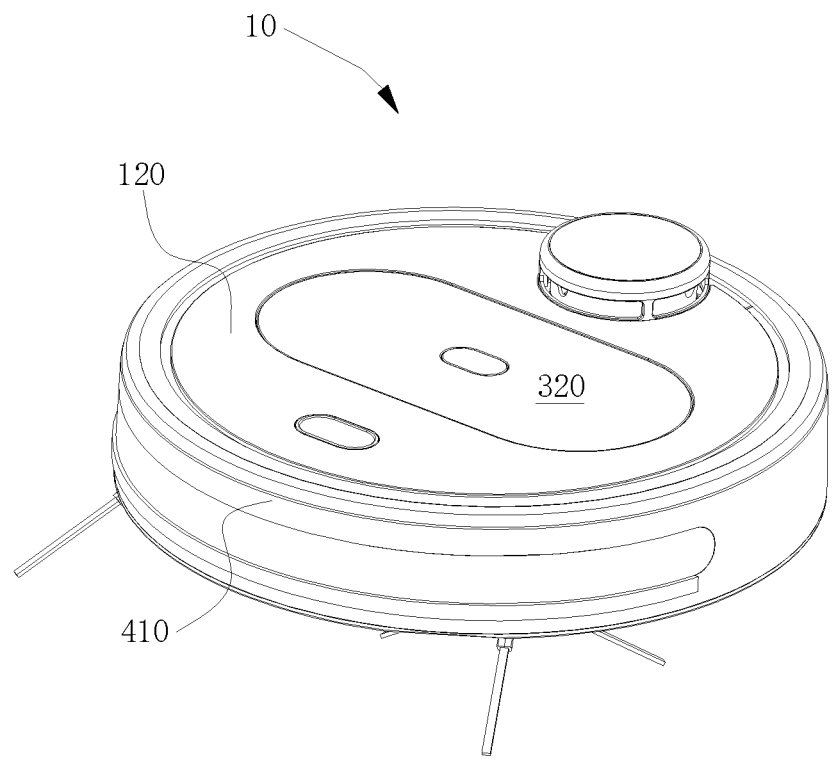
FIG. 1 is a schematic structural diagram of the mobile robot according to an embodiment of the present application.

The technical solutions in the embodiments of the present application will be described in detail below with reference to the drawings in the embodiments of the present application. Obviously, the described embodiments are only a part of the embodiments of the present application, but not all of the embodiments. Based on the embodiments of the present application, all other embodiments obtained by a person of ordinary skill in the art without creative efforts shall fall within the protection scope of the present application.

The technical solutions in the embodiments of the present application will be clearly described below with reference to the accompanying drawings in the embodiments of the present application. Obviously, the described embodiments are only partial embodiments of the present application, but not all the embodiments. Based on the embodiments of the present application, all other embodiments obtained by a person of ordinary skill in the art without creative efforts shall fall within the protection scope of the present application.

In the embodiments of the present application, a singular expression may mean a plural expression when there is not explicitly antisense in the context. In addition, the terms "including" or "having" are used to indicate the existence of a feature, a number, a step, an operation, a constituent element, a component, or combinations thereof described in the specification, without precluding the existence or additional possibility of one or more other features, numbers, steps, operations, constituent elements, components, or combinations thereof. In addition, the terms such as "first" and "second" used in this specification that include ordinal numbers can be used to describe various constituent elements, but the constituent elements are not limited by the above terms, and the terms are only used to distinguish one constituent element from other constituent elements.

Hereinafter, the disclosed embodiments of the present application will be described in detail with reference to the drawings. The same reference numerals or symbols shown in the drawings may indicate components or constituent elements that perform substantially the same function.

Figure 2:
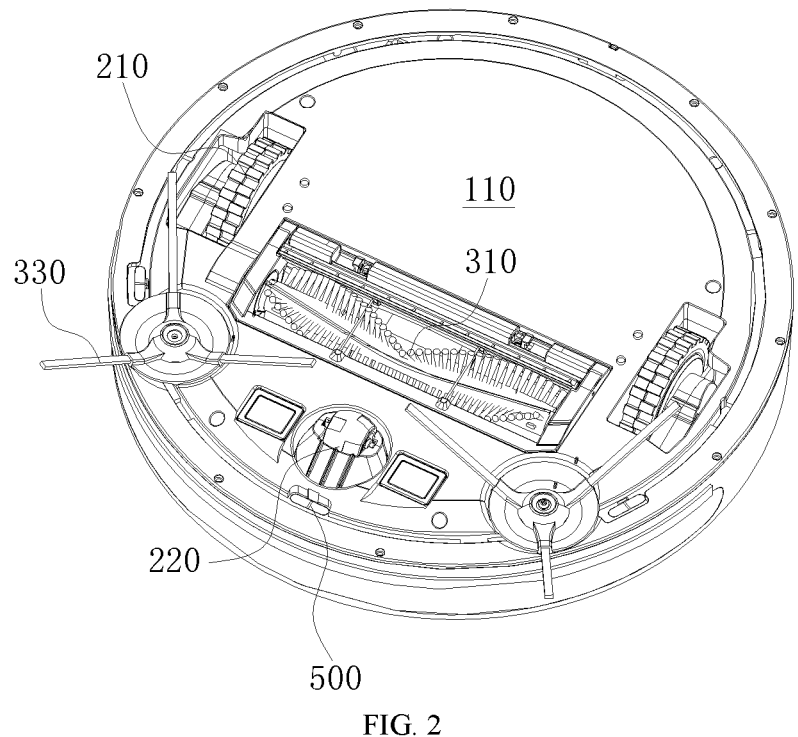
FIG. 2 is a schematic structural diagram of a bottom of the mobile robot in FIG. 1.

FIG. 1 is a schematic structural diagram of the mobile robot according to an embodiment of the present application, and FIG. 2 is a schematic structural diagram of a bottom of the mobile robot in FIG. 1.

Referring to FIG. 1 and FIG. 2, in the embodiment of the present application, that the mobile robot 10 is a cleaning robot is taken as an example for description. In other optional embodiments, the mobile robot 10 may also be an escort robot, a meal delivery robot, a welcome robot, and a remote camera robot, etc.

The mobile robot 10 includes a body, and the body may include a chassis 110 and an upper cover 120 that is detachably mounted on the chassis 110 to protect various functional components inside the mobile robot 10 from severe impact or damage of inadvertently dripped liquid during use. The chassis 110 and/or the upper cover 120 are configured to carry and support various functional components. In an alternative embodiment, the body of the mobile robot 10 may also be other designs or structures, for example, the body is an integrally formed structure, or a structure in which a left part is separated from a right part. In the embodiments of the present application, the material, shape, structure, etc. of the body are not limited.

The mobile robot 10 includes a drive system connected to the body and configured to drive the mobile robot 10 to move on the ground. For example, the mobile robot 10 may be designed to autonomously plan a path on the ground, or may be designed to move on the ground in response to a remote control command. In an embodiment of the present application, the drive system includes two wheels 210, at least one universal wheel 220, and a motor configured to drive the wheel 210 to rotate. The wheels 210 and the universal wheel 220 at least partially protrude from the bottom of the chassis 110, for example, under the effect of its own weight of the mobile robot 10, the two wheels 210 may be partially hidden inside the chassis 110. In an alternative embodiment, the drive system may further include any one of a triangle track wheel, a mecanum wheel, and the like.

The mobile robot 10 may further include a cleaning system. For example, the cleaning system includes one or two of a middle sweeping hairbrush 310 and a middle sweeping rubber brush. The middle sweeping hairbrush 310 and the middle sweeping rubber brush are suitable to be arranged in a receiving groove 111 provided at the bottom of the chassis 110, the receiving groove 111 is provided with a dust suction inlet therein, and the dust suction inlet is connected with a dust chamber 320 and a dust suction draught fan, so that the dust or rubbish on the ground are stirred up when the middle sweeping hairbrush 310 rotates, and the dust or rubbish are sucked from the dust suction inlet into the dust chamber 320 through using suction force generated by the dust suction draught fan. In addition to the middle sweep hairbrush 310 and/or the middle sweep rubber brush, the mobile robot 10 may further include a side sweeper 330, and a sweeping coverage area of the side sweeper 330 extends beyond an outer contour of the body, which is beneficial to effectively clean wall edges, corners, and edges of obstacles.

The mobile robot 10 may further include a mopping system. For example, the mopping system includes a water storage tank, a cleaning cloth, and the like. The water storage tank and the dust chamber 320 may be arranged separately or may be designed to be integrated. In an alternative embodiment, the water in the water storage tank is sucked out by a water suction pump and dripped evenly on the cleaning clot, and the wet cleaning cloth wipes the ground when the mobile robot 10 moves on the ground. In an alternative embodiment, the water in the water storage tank is atomized by an atomizer to form water mist spraying toward the ground, and then the cleaning cloth wipes the ground sprayed by the water mist.

The mobile robot 10 may further include a collision sensing device formed on at least a part of an outer periphery of the body. In an embodiment of the present application, the collision sensing device includes a collision component 410 surrounding the outer periphery of the body, and a sensor and an elastic mechanism both provided between the body and the collision component 410. The elastic mechanism and the sensor are provided between the collision component 410 and the body, which includes but is not limited to the following cases: 1) the elastic mechanism and the sensor are located between the collision component 410 and the body; 2) the elastic mechanism and/or the sensor is mounted on the body, but a part of the elastic mechanism and/or the sensor is located between the collision component 410 and the body; 3) the elastic mechanism and/or the sensor is mounted on the collision component 410, but a part of the elastic mechanism and/or the sensor is located between the collision component 410 and the body; 4) the elastic mechanism and/or the sensor is mounted on the collision component 410 and the body. The elastic mechanism is configured to maintain a uniform moving gap between the collision component 410 and the body, and the sensor is configured to sense a relative displacement between the collision component 410 and the body. The sensor may be any one or more of a micro switch, a Hall switch, an infrared photoelectric switch, etc. A plurality of sensors may be provided between the body and the collision component 410, for example, at least one sensor is uniformly distributed between the body and the collision component 410 at front and two sides of the mobile robot 10. The sensor is usually electrically connected to a controller, a processor, or a control system (not shown) on the mobile robot 10 in order to collect data from the sensor to control the mobile robot 10 to take a corresponding action. Since the collision component 410 surrounds the body, no matter which part of the collision component 410 collides with an obstacle when the mobile robot 10 moves, a relative displacement between the collision component 410 and the body will generate. Since the sensor can sense the relative displacement between the collision component 410 and the body, the mobile robot 10 can sense the collision of the obstacle. The mobile robot 10 can change a movement direction to bypass the collided obstacle or take other corresponding measures.

Figure 3:
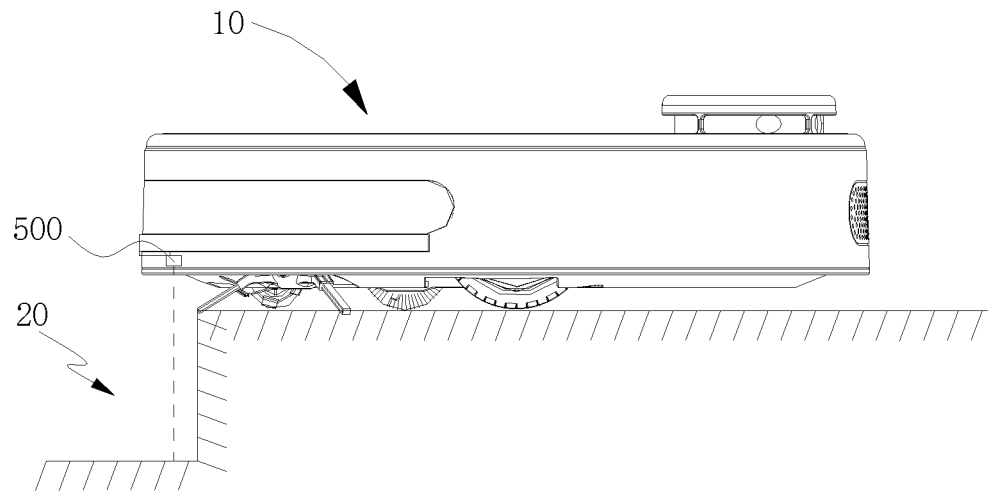
FIG. 3 is a scene diagram when a light detection module of the mobile robot is applied to detect a cliff.
Figure 4:
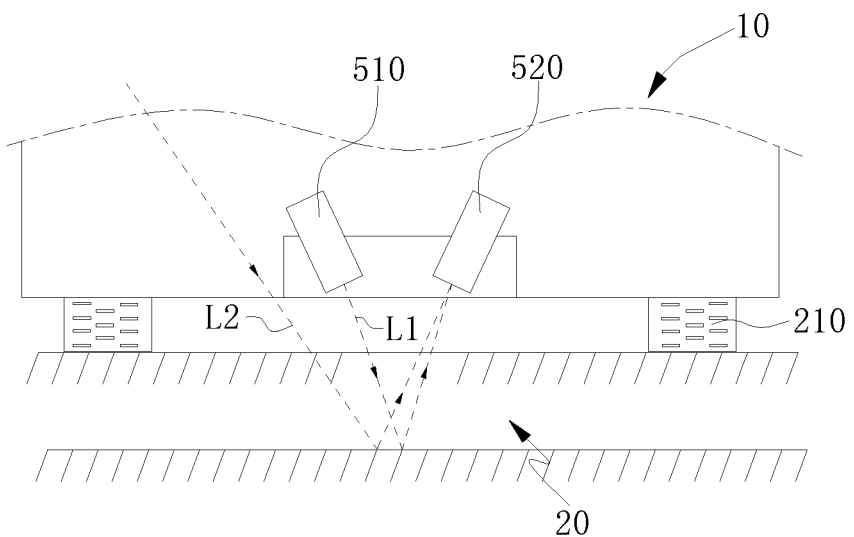
FIG. 4 is a schematic diagram in which a photoelectric sensor receives light emitted from a light emitter and ambient light in the scene as shown in FIG. 3.

FIG. 3 is a scene diagram when a light detection module 500 of the mobile robot 10 is applied to detect a cliff 20 in an embodiment of the present application, and FIG. 4 is a schematic diagram in which a photoelectric sensor 520 receives light L1 emitted from a light emitter 510 and ambient light L2 in the scene as shown in FIG. 3.

Referring to FIG. 3 and FIG. 4, in an embodiment of the present application, the light emitter 510 is supported by the body and is configured to emit light toward the ground, and the photoelectric sensor 520 is supported by the body and responsive to the light from the environment and/or emitted by the light emitter 510.

Specifically, the light emitter 510 and the photoelectric sensor 520 are adjacently arranged at the bottom of the mobile robot 10. When the mobile robot 10 moves on the ground, the light emitter 510 may emit light vertically toward the ground, or may emit light L1 toward the ground with oriented toward the photoelectric sensor 520 at a certain angle. Similarly, the photoelectric sensor 520 may be arranged vertical toward the ground at the bottom of the mobile robot 10, or may be arranged at the bottom of the mobile robot 10 with oriented toward the light emitter 510 at a certain angle.

In an embodiment of the present application, the light emitter 510 is configured to emit infrared rays toward the ground, and the photoelectric sensor 520 is responsive to the infrared rays from the environment and/or emitted by the light emitter 510, that is, the light emitter 510 includes an infrared emission tube, and the photoelectric sensor 520 includes an infrared reception tube. In fact, the infrared rays from the environment are mainly generated by sunlight, lamplight, etc., and in most cases, the environment in which the mobile robot 10 works is inevitably affected by the sunlight or lamplight. Therefore, in order to reduce the influence incurred by the infrared rays from the environment, the infrared emission tube is turned on for a period of time to collect the signal (recorded as X1) from the infrared reception tube, and then the infrared emission tube is turned off for a period of time to collect the signal (recorded as X2) from the infrared reception tube; because the generation of the signal X1 is affected by the infrared rays from the environment and the infrared rays emitted by the light emitter 510 at the same time, and the generation of the signal X2 is affected by the infrared rays from the environment, the difference value (recorded as X3) between the signal X1 and the signal X2 is obtained, and then the difference value X3 is compared with a preset threshold to determine whether the mobile robot 10 has encountered a cliff. It should be noted that the "cliff" mentioned in this specification refers to a situation that there is a certain height drop relative to the ground where the mobile robot 10 is currently located.

In a practical application, when the mobile robot 10 encounters a cliff, the infrared rays emitted by the light emitter 510 are projected toward the cliff, and only a small amount of reflected infrared rays are received by the photoelectric sensor 520, thus the difference value X3 is small; when the mobile robot 10 does not encounter a cliff, the infrared rays emitted by the light emitter 510 are projected toward the ground, and a large amount of reflected infrared rays are received by the photoelectric sensor 520, thus the difference value X3 is relatively large. Therefore, whether the mobile robot 10 has encountered a cliff may be determined according to the difference value X3.

Figure 5:
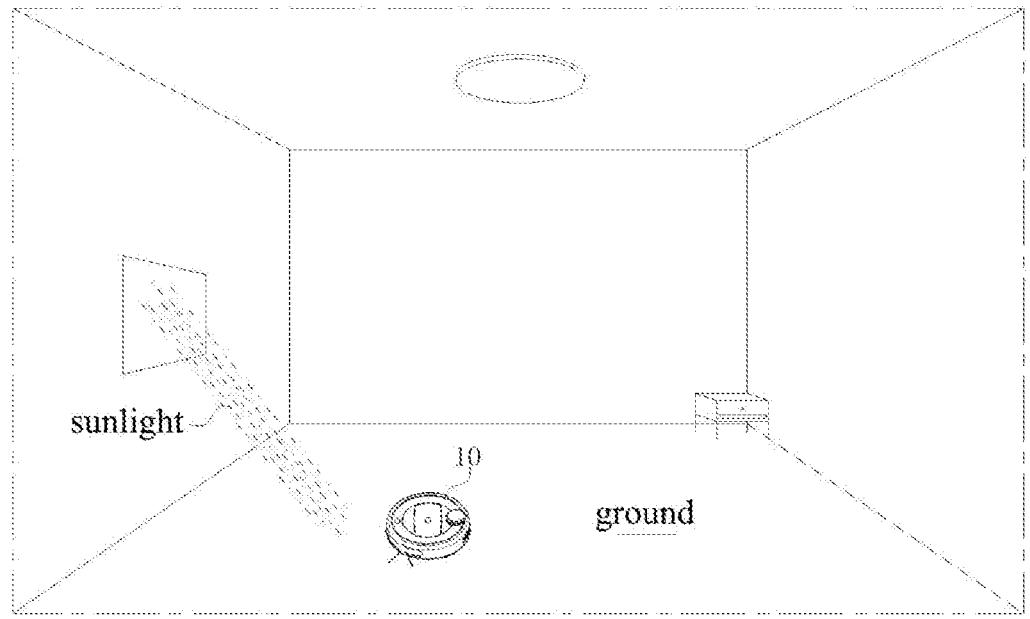
FIG. 5 is a schematic diagram of an application scenario where a mobile robot works in a room exposed with relatively strong sunlight.

FIG. 5 is a schematic diagram of an application scenario where the mobile robot works in a room exposed with relatively strong sunlight. For example, in a special case of FIG. 5, the ground is irradiated with relatively strong sunlight, and the infrared reception tube is limited by its own property and reaches saturation, that is, when the intensity of the infrared rays incident onto the infrared reception tube reaches a certain level, the current intensity of the infrared reception tube through photoelectric conversion tends to be stable, so there is no significant difference between the signal X1 and the signal X2, and the difference value X3 is very small. Through combining with the method for determining whether the mobile robot 10 encounters a cliff mentioned above, it can be known that the ground irradiated by strong light is easily and wrongly determined as a cliff by the mobile robot 10, so that the mobile robot 10 takes an unexpected action such as retreating and turning. As a result, the mobile robot 10 cannot move over the ground area exposed to strong light; and when the mobile robot 10 is a cleaning robot, the cleaning robot cannot clean the ground area exposed to strong light, resulting in missing cleaning.

For example again, when the mobile robot 10 encounters a black blanket laid on the ground, most of the infrared rays emitted from the light emitter 510 are absorbed by the black blanket since the black blanket is provided with a property of strong light absorption, and only a small amount of reflected infrared rays are received by the photoelectric sensor 520, thereby the infrared reception tube is possibly not turned on and the difference value X3 is zero or the difference value X3 is very small, which is subject to its own property of the infrared reception tube. Combining the above-mentioned method for determining whether the mobile robot 10 encounters a cliff, it can be seen that the ground laid with a light-absorbent material such as the black blanket is easily and wrongly determined as a cliff by the mobile robot 10, and unexpected actions such as backing and turning are taken, resulting in that the mobile robot 10 cannot move over the ground area laid by the light-absorbent material such as the black blanket; further, when the mobile robot 10 is a cleaning robot, the cleaning robot cannot clean the ground area laid by the light-absorbing material such as the black blanket, resulting in missed cleaning.

Figure 6:
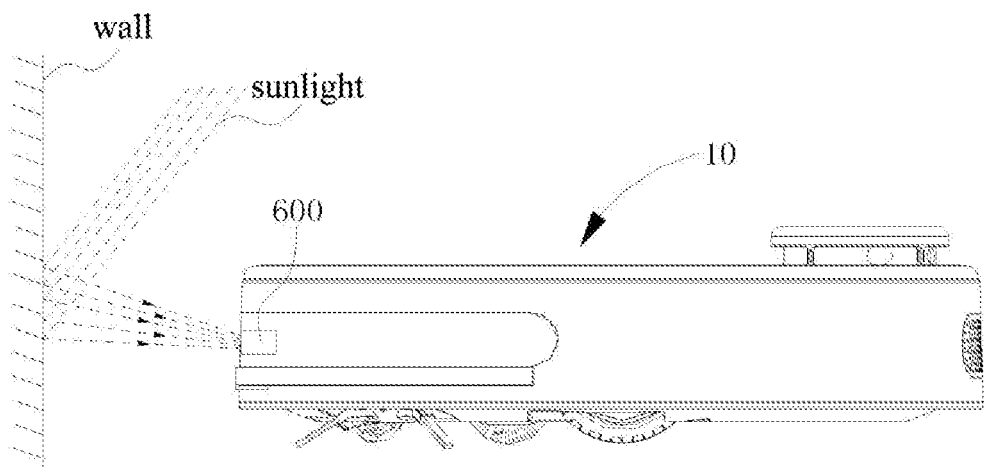
FIG. 6 is a scene diagram in which the light detection module of the mobile robot is applied to detect a wall.

FIG. 6 is a scene diagram in which a light detection module 600 of the mobile robot 10 is applied to detect a wall in an embodiment of the present application. Referring to FIG. 6, in an embodiment of the present application, the light detection module 600 is provided on the outer periphery of the body, and there may be a plurality of light detection modules 600, for example, the plurality of light detection modules 600 are spaced along the outer periphery of the body. Among them, each of the light detection modules 600 includes the mated light emitter and photoelectric sensor. The relative positional relationship between the light emitter and the photoelectric sensor in the light detection module 600 may refer to the relative positional relationship between the light emitter 510 and the photoelectric sensor 520 in the above-mentioned light detection module 500, and details of which are not described herein again.

In an embodiment of the present application, the light emitter is configured to emit infrared rays toward the wall, the photoelectric sensor is responsive to the infrared rays from the environment and/or emitted by the light emitter, that is, the light emitter includes the infrared emission tube and the photoelectric sensor includes the infrared reception tube. In fact, the infrared rays from the environment are mainly generated by the sunlight, lamplight, etc., and the environment in which the mobile robot 10 works is inevitably affected by the sunlight or lamplight in most case. Therefore, in order to reduce the influence incurred by the infrared rays from the environment, the infrared emission tube is turned on for a period of time to collect the signal (recorded as X1) from the infrared reception tube, and then the infrared emission tube is turned off for a period of time to collect the signal (recorded as X2) from the infrared reception tube; because the generation of the signal X1 is affected by the infrared rays from the environment and the infrared rays emitted by the light emitter 510 at the same time, and the generation of the signal X2 is affected by the infrared rays from the environment, the difference value (recorded as X3) between the signal X1 and the signal X2 is obtained, and then the difference value X3 is compared with a preset threshold to determine whether the mobile robot 10 is close to a detection surface such as a wall, an obstacle, etc.

In a practical application, when the mobile robot 10 is not close to the detection surface such as a wall or an obstacle or the like, the infrared rays emitted by the light emitter of the light detection module 600 are directed to surroundings, and only a small amount of reflected infrared rays are received by the light detection module 600 of the photoelectric sensor, thus the difference value X3 is very small;

when the mobile robot 10 is close to the detection surface such as a wall or an obstacle or the like, the infrared rays emitted by the light emitter are directed to the detection surface such as the wall, the obstacle, or the like, and a large amount of reflected infrared rays are received by the photoelectric sensor, thus the difference value X3 is relatively large. Therefore, it can be determined whether the mobile robot 10 is close to the detection surface such as a wall, an obstacle, etc. based on the difference value X3. When the mobile robot 10 is determined as close to the detection surface such as a wall, an obstacle, etc., the mobile robot 10 is usually controlled to perform an evasion action such as deceleration, steering, or backing, etc.

For example, in the special case of FIG. 6, the wall is irradiated with relatively strong sunlight, and the infrared reception tube reaches saturation due to its own property, that is, when the intensity of the infrared rays directed onto the infrared reception tube reaches a certain level, the current intensity of the infrared reception tube through photoelectric conversion tends to be stable. Therefore, there is no significant difference between the signal X1 and the signal X2, and the difference value X3 is very small. Combining the above-mentioned method for determining whether the mobile robot 10 is close to a detection surface such as a wall, an obstacle, etc., it can be known that when the mobile robot 10 encounters the detection surface such as a wall, an obstacle, etc. irradiated by strong light, it is easily and wrongly determined that the mobile robot 10 is not yet close to a wall, an obstacle, etc., thereby the mobile robot 10 continues an unexpected movement such as keeping original moving speed, or accelerated movement, etc., causing the mobile robot 10 to collide violently against the wall, the obstacle, or the like.

For example again, when the mobile robot 10 encounters a detection surface such as a wall, an obstacle, etc. covered by a black light-absorbing material, since the black light-absorbing material is provided with the property of strong light absorption, most of the infrared rays emitted from the light emitter of the light detection module 600 is absorbed by the black light-absorbing material, only a small amount of reflected infrared rays are received by the photoelectric sensor, thus the infrared reception tube is possibly not turned on due to its own property, and the difference value X3 is zero or the difference value X3 is very small. Combining the above-mentioned method for determining whether the mobile robot 10 is close to a detection surface such as a wall, an obstacle, etc., it can be known that when the mobile robot 10 encounters the detection surface such as a wall, an obstacle, etc. covered by a black light-absorbing material, it is easily and wrongly determined that the mobile robot 10 is not yet close to a wall, an obstacle, etc., thereby the mobile robot 10 continues an unexpected movement such as keeping original moving speed, or accelerated movement, etc., causing the mobile robot 10 to collide violently against the wall, the obstacle, or the like.

Figure 7:
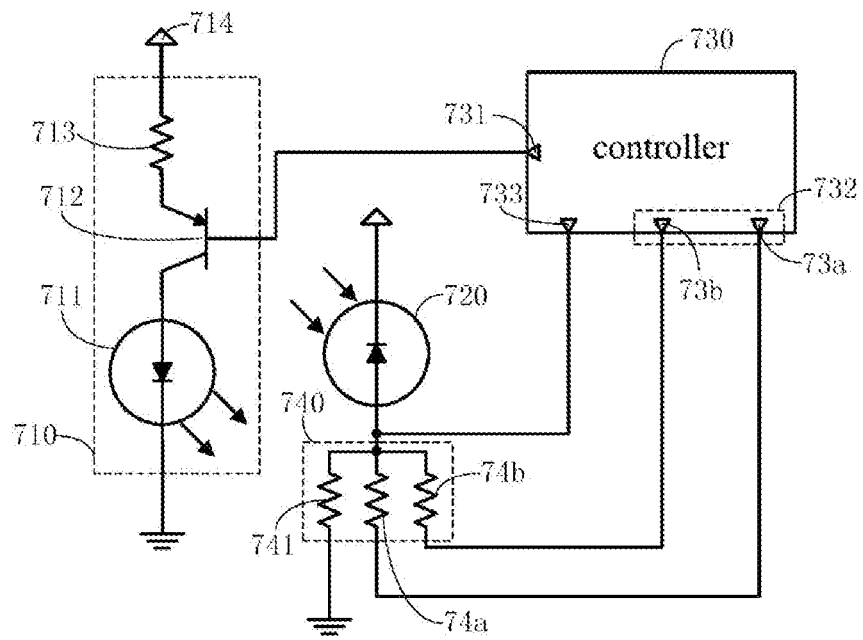
FIG. 7 is a circuit diagram of an embodiment applied to the mobile robot.
Figure 8:
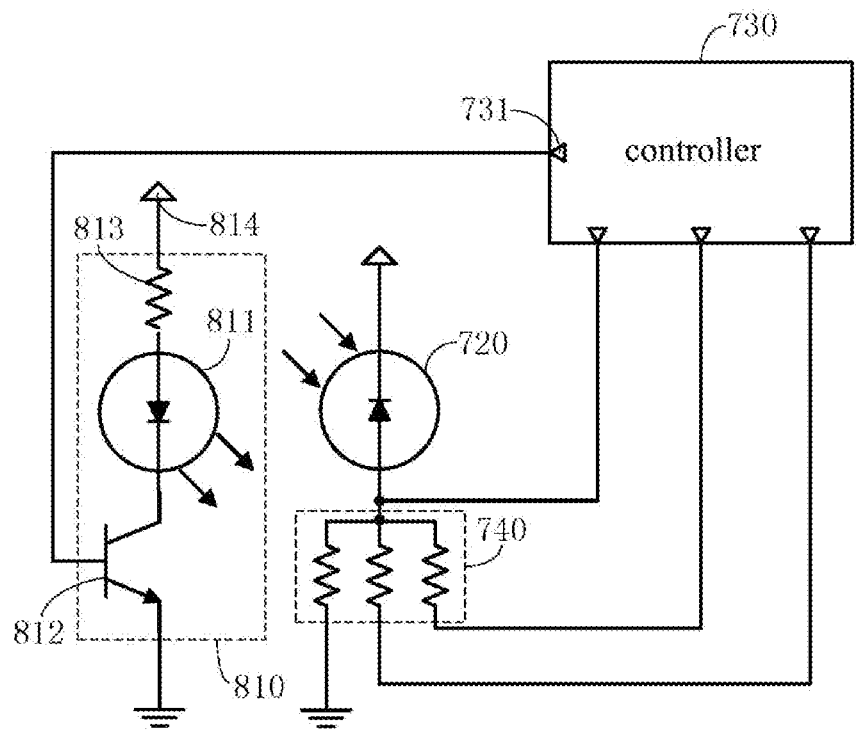
FIG. 8 is a circuit diagram of another embodiment applied to THE mobile robot.

The light emitter and the photoelectric sensor 720 of the mobile robot 10 in the embodiments of the present application are applied to a circuit diagram as shown in FIG. 7 or FIG. 8, and cooperate with control logics from a controller 730 for the light emitter and the adjustable impedance unit 740 to solve the above problem of erroneous determination. The light emitter 510 of the light detection module 500 or the light emitter of the light detection module 600 may refer to the light emitter in FIG. 7 or FIG. 8, and the photoelectric sensor 520 of the light detection module 500 or the photoelectric sensor of the light detection module 600 may refer to the photoelectric sensor 720 in FIG. 7 or FIG. 8.

The difference between the circuit diagrams in FIGS. 7 and 8 lies in the light emitter. Specifically, in FIG. 7, the light emitter 710 includes: an infrared emission tube 711, a PNP transistor 712, and a current-limiting resistor 713. A collector of the PNP transistor 712 is connected to an anode of the infrared emission tube 711, and a cathode of the infrared emission tube 711 is grounded; an emitter of the PNP transistor 712 is connected to a driving power supply 714 via the current-limiting resistor 713; a base of the PNP transistor 712 is connected to a signal control port 731 of the controller 730. In FIG. 8, the light emitter 810 includes: an infrared emission tube 811, an NPN transistor 812, and a current-limiting resistor 813. A collector of the NPN transistor 812 is connected to a cathode of the infrared emission tube 811, and an anode of the infrared emission tube 812 is connected to a driving power source 814 via the current-limiting resistor 813; an emitter of the NPN transistor 812 is grounded; a base of the NPN transistor 812 is connected to a signal control port 731 of the controller 730.

Hereinafter, the circuit diagram in FIG. 7 will be used as an example to explain in detail how the controller 730 solves the above-mentioned problem of erroneous determination through the control logics for the light emitter 710 and the adjustable impedance unit 740.

In summary, the controller 730 is configured to adjust the adjustable impedance unit 740 to form at least two setting values with different impedances, and to be responsive to a sampling difference value between sampling values determined when the light emitter is in an ON state and an OFF state under each of the setting values, such that the mobile robot is prevented from performing an unexpected action due to erroneous determination. In an embodiment of the present application, the adjustable impedance unit 740 is formed by connecting at least two resistors in parallel. In other embodiments, the adjustable impedance unit 740 may also be formed in other forms and may be considered into use as long as it can be adjusted by the controller 730 to form at least two setting values with different impedances. The controller 730 may be a micro control unit such as a single chip microcomputer, a field-programmable gate array (FPGA), an application-specific integrated circuit (ASIC), etc. The adjustable impedance unit 740 may be integrated in the controller 730, or may also exist as a peripheral circuit of the controller 730.

In an embodiment of the present application, the controller 730 is provided with: an impedance adjustment port 732 connected to the adjustable impedance unit 740, a signal sampling port 733 connected between the photoelectric sensor 720 and the adjustable impedance unit 740, and a signal control port 731 connected to the light emitter 710.

Figure 9:
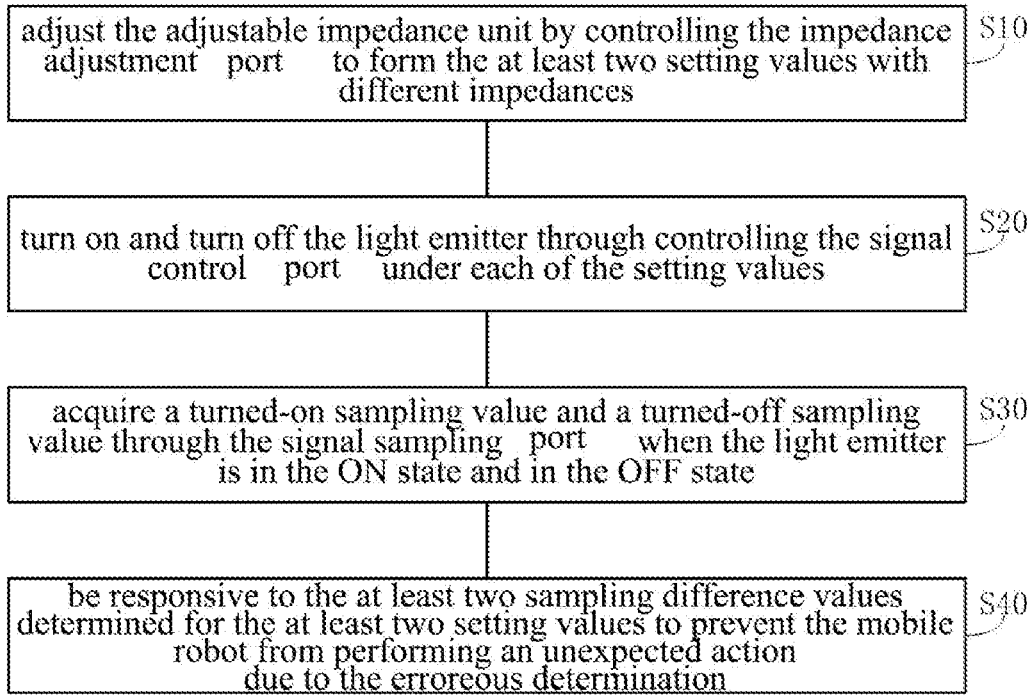
FIG. 9 is a flowchart of method steps executed by a controller in the mobile robot.

Specifically, as shown in FIG. 9, the controller 730 is configured to perform method steps S10, S20, S30, and S40.

The step S10 includes: adjusting the adjustable impedance unit 740 by controlling the impedance adjustment port 732 to form at least two setting values with different impedances.

In an embodiment of the present application, the adjustable impedance unit 740 includes a first resistor 741 and two second resistors, and these two second resistors are labeled as a second resistor 74*a* and a second resistor 74*b* respectively for convenience of reference. One ends of the first resistor 741, the second resistor 74*a*, and the second resistor 74*b* are connected to the photoelectric sensor 720, the other end of the first resistor 741 is grounded, and the other ends of the second resistor 74*a* and the second resistor 74*b* are connected to the controller 730. The impedance adjustment port 732 includes two impedance adjustment ports, and these two impedance adjustment ports are labeled as an impedance adjustment port 73*a* and an impedance adjustment port 73*b* respectively for convenience of reference. The other end of the second resistor 74*a* is connected to the impedance adjustment port 73*a*, and the other end of the second resistor 74*b* is connected to the impedance adjustment port 73*b*. In other embodiments, the other end of the first resistor 741 may also be connected to the impedance adjustment port or the ground port of the controller 730.

In a practical application, through controlling the impedance adjustment port 73*a* and the impedance adjustment port 73*b* to be in a high-impedance state, there is only the first resistance 741 between the photoelectric sensor 720 and ground, and at this time the photoelectric sensor 720 is provided with the largest impedance to the ground (reaching the largest setting value). Through controlling both the impedance adjustment port 73*a* and the impedance adjustment port 73*b* to be set to zero, there is a parallel connection of three resistors, i.e. the first resistor 741, the second resistor 74*a*, and the second resistor 74*b*, between the photoelectric sensor 720 and the ground, and at this time the photoelectric sensor 720 is provided with the smallest impedance to the ground (reaching the smallest setting value). Through controlling one of the impedance adjustment port 73*a* and the impedance adjustment port 73*b* to be in a high-impedance state and the other to be set to zero, there is a parallel connection of the first resistor 741 and the second resistor 74*a* or a parallel connection of the first resistor 741 and the second resistor 74*b* between the photoelectric sensor 720 and ground, and at this time the photoelectric sensor 720 is provided with a medium impedance to the ground (reaching the medium setting value).

To sum up, through adjusting the impedance adjustment port 73*a* and the impedance adjustment port 73*b* to adjust the adjustable impedance unit 740, three different setting values with different impedances may be formed, namely the largest setting value, the medium setting value, and the smallest setting value.

In other embodiments, the adjustable impedance unit 740 includes a first resistor 741 and a second resistor, one port of the second resistor is connected to the photoelectric sensor 720, and the other port of the second resistor is connected to the impedance adjustment port 732 of the controller 730. It is easy to know that the adjustable impedance unit 740 can only form two setting values with different impedances through controlling this impedance adjustment port 732 to be in a high-impedance state or to be set to zero.

The step S20 includes: turning on and turning off the light emitter 710 through controlling the signal control port 731 under each of the setting values.

In an embodiment of the present application, the light emitter 710 is turned on by controlling the signal control port 731 to be zero. Specifically, when the signal control port 731 is set to zero, the PNP transistor 712 is turned on, and the infrared emission tube 711 emits infrared rays. The light emitter 710 is turned off by controlling the signal control port 731 to be in a high-resistance state, the PNP transistor 712 is cut off when the signal control port 731 is in the high-resistance state, and the infrared emission tube 711 does not emit infrared rays.

The step S30 includes: acquiring a turned-on sampling value and a turned-off sampling value through the signal sampling port 733 when the light emitter 710 is in an ON state and in an OFF state.

In an embodiment of the present application, under the largest setting value, the light emitter 710 may be turned on first through controlling the signal control port 731, and the turned-on sampling value (can be called the turned-on sampling value at the largest setting value) may be acquired through the signal sampling port 733 when the light emitter 710 is in the ON state; and then the light emitter 710 is turned off through controlling the signal control port 731, and the turned-off sampling value (can be called the turned-off sampling value at the largest setting value) is acquired through the signal sampling port 733 when the light emitter 710 is in the OFF state.

Under the medium setting value, the light emitter 710 may be turned on first through controlling the signal control port 731, and the turned-on sampling value (can be called the turned-on sampling value at the medium setting value) may be acquired through the signal sampling port 733 when the light emitter 710 is in the ON state; and then the light emitter 710 is turned off through controlling the signal control port 731, and the turned-off sampling value (can be called the turned-off sampling value at the medium setting value) is acquired through the signal sampling port 733 when the light emitter 710 is in the OFF state.

Under the smallest setting value, the light emitter 710 may be turned on first through controlling the signal control port 731, and the turned-on sampling value (can be called the turned-on sampling value at the smallest setting value) may be acquired through the signal sampling port 733 when the light emitter 710 is in the ON state; and then the light emitter 710 is turned off through controlling the signal control port 731, and the turned-off sampling value (can be called the turned-off sampling value at the smallest setting value) is acquired through the signal sampling port 733 when the light emitter 710 is in the OFF state.

The step S40 includes: responding to at least two sampling difference values determined for at least two setting values, to prevent the mobile robot 10 from performing an unexpected action due to erroneous determination. The sampling difference value is a difference value between the turned-on sampling value and the turned-off sampling value.

In an embodiment of the present invention, three sampling difference values under three setting values may be acquired, that is, the sampling difference value at the largest setting value formed between the turned-on sampling value at the largest setting value and the turned-off sampling value at the largest setting value, the sampling difference value at the medium setting value formed between the turned-on sampling value at the medium setting value and the turned-off sampling value at the medium setting value, and the sampling difference value at the smallest setting value formed between the turned-on sampling value at the smallest setting value and the turned-off sampling value at the smallest setting value In order to prevent the error caused by a single sampling, in an alternative embodiment, a method of sampling multiple times and averaging the sampling values is used. Specifically, when the light emitter 710 is in the ON state, a plurality of turned-on sampling values are acquired through the signal sampling port 733, and an average turned-on sampling value is acquired based on the plurality of turned-on sampling values; when the light emitter 710 is in the OFF state, a plurality of turned-off sampling values are acquired through the signal sampling port 733, and an average turned-off sampling value is acquired based on the plurality of turned-off sampling values. The sampling difference value is a difference value between the average turned-on sampling value and the average turned-off sampling value.

In order to determine which kind of environment the mobile robot 10 works in, in an embodiment of the present application, the mobile robot 10 is placed in each kind of environment in advance, and the sampling values at three setting values, i.e. the largest setting value, the medium setting value and the smallest setting value, in every environments are acquired, thereby forming preset data. Taking it as an example that the light emitter is arranged at the bottom of the mobile robot 10 and is configured to emit light toward the ground, the working environment includes four kinds: ground illuminated by strong light, ground provided with normal brightness, ground covered by a black blanket, and a cliff. At the same time, in order to more visually represent the size of the sampling difference values, the larger sampling difference value is tentatively indicated as obvious, and the smaller sampling difference value is tentatively indicated as non-obvious. The following table is drawn to show differences of combinations of the largest setting value, the medium setting value and the smallest setting value for the mobile robot 10 in the above four working environments, and the mobile robot 10 is determined to be at which kind of working environment among the above four working environments based on the differences of these combinations, so as to prevent erroneous determination and realize the mobile robot 10 be controlled to perform normal actions.

| working environment | setting values | | |
|---|---|---|---|
| | largest setting value | medium setting value | smallest setting value |
| | obvious or not | | |
| ground illuminated by strong light | non obvious | non-obvious | obvious |
| ground provided with normal brightness | obvious | obvious | obvious |
| ground covered by black blanket | obvious | non-obvious | non-obvious |
| cliff | non-obvious | non-obvious | non-obvious |

It can be seen from the above table that, when the mobile robot 10 is in a working environment where the ground is illuminated by strong light, the obviousness combination of the sampling difference values at the largest setting value, the medium setting value and the smallest setting value is (non-obvious, non-obvious, obvious); when the mobile robot 10 is in a working environment where the ground is provided with normal brightness, the obviousness combination of the sampling difference values at the largest setting value, the medium setting value and the smallest setting value is (obvious, obvious, obvious); when the mobile robot 10 is in a working environment where the ground is covered with a black blanket, the obviousness combination of the sampling difference values at the largest setting value, the medium setting value and the smallest setting value is (obvious, non-obvious, non-obvious); when the mobile robot 10 encounters a cliff in the working environment, the obviousness combination of the sampling difference values at the largest setting value, the medium setting value and the smallest setting value is (non-obvious, non-obvious, non-obvious). Obviously, there are differences in the four obviousness combinations in the above four working environments.

Therefore, in a practical application of the mobile robot 10, the adjustable impedance unit 740 is repeatedly adjusted by the controller 730 to be at the largest setting value, the medium setting value and the smallest setting value, and the determined sampling difference combinations are recorded at the three setting values with different impedances. These sampling difference combinations are compared with the preset data to acquire a comparison result, and it can be known which kind of environment the mobile robot 10 is in among the above four working environments according to the comparison result.

It can be understood from the above descriptions for the three setting values with different impedances that, in other embodiments, the controller 730 may also be configured to adjust the adjustable impedance unit 740 at two setting values, i.e. the largest setting value and the smallest setting value. The following table is drawn to show differences of combinations of the largest setting value and the smallest setting value for the mobile robot 10 in the above four working environments, and the mobile robot 10 is determined to be at which kind of working environment among the above four working environments based on the differences of these combinations, so as to prevent erroneous determination and realize the mobile robot 10 be controlled to perform normal actions.

| working environment | setting values | |
|---|---|---|
| | largest setting value | smallest setting value |
| | obvious or not | |
| ground illuminated by strong light | non-obvious | obvious |
| ground provided with normal brightness | obvious | obvious |
| ground covered with a black blanket | obvious | obvious |
| cliff | obvious | obvious |

It can be seen from the above table that, when the mobile robot 10 is in a working environment where the ground is illuminated by strong light, the obviousness combination of the sampling difference values at the largest setting value and the smallest setting value is (non-obvious, obvious); when the mobile robot 10 is in a working environment where the ground is provided with normal brightness, the obviousness combination of the sampling difference values at the largest setting value and the smallest setting value is (obvious, obvious); when the mobile robot 10 is in a working environment where the ground is covered with a black blanket, the obviousness combination of the sampling difference values at the largest setting value and the smallest setting value is (obvious, non-obvious); when the mobile robot 10 encounters a cliff in the working environment, the obviousness combination of the sampling difference values at the largest setting value and the smallest setting value is (non-obvious, non-obvious). Obviously, there are differences in the four obviousness combinations in the above four working environments.

Therefore, in a practical application of the mobile robot 10, the adjustable impedance unit 740 is repeatedly adjusted by the controller 730 to be at the largest setting value and the smallest setting value, and the determined sampling difference combinations are recorded at the two setting values with different impedances. These sampling difference combinations are compared with the preset data to acquire a comparison result, and it can be known which kind of environment the mobile robot 10 is in among the above four working environments according to the comparison result.

Similarly, the control logics of the controller 730 to the light emitter 710 and the adjustable impedance unit 740 provided on the outer periphery of the body can also be used to solve the problem of erroneous determination on the detection surface such as a wall or an obstacle etc. For example, it can be determined which kind environment the mobile robot 10 encounters among three working environments, i.e., the wall illuminated with strong light, the wall provided with normal brightness, and the wall covered by a black light-absorbing material.

An embodiment of the present application provides a mobile robot 10, including: a body, a drive system driving the mobile robot 10 to move, a light emitter emitting light toward a detection surface, a photoelectric sensor responsive to light from environment and/or the light emitted by the light emitter, an adjustable impedance unit 740 connected to the photoelectric sensor, and a controller 730. The controller 730 adjusts the adjustable impedance unit 740 to form at least two setting values with different impedances, and is responsive to a sampling difference value between sampling values determined while the light emitter is in an ON state and an OFF state under each of the setting values, so as to prevent the mobile robot 10 from performing an unexpected action due to erroneous determination, so that the mobile robot 10 can work in the special working environment where the detection surface is illuminated by strong light or the black detection surface is provided with a property of light absorbing.

In the description of this specification, the description, such as the terms "one embodiment", "some embodiments", "examples", "specific examples" or "an alternative embodiment", etc., means that a specific feature, structure, material, or characteristic described with reference to the embodiment or example is included in at least one embodiment or example of the present application. In this specification, the illustrative expression of the above terms does not necessarily refer to the same embodiment or example. Moreover, the described specific feature, structure, material, or characteristic may be combined in any suitable manner with any one or more embodiments or examples.

The above-mentioned embodiments do not constitute a limitation on the protection scope of the technical solutions. Any modification, equivalent replacement and improvement made within the spirit and principles of the above-mentioned embodiments should be included in the protection scope of the technical solutions.

What is claimed is:

1. A mobile robot, comprising:
a body;
a drive system, connected to the body and configured to drive the mobile robot to move;
a light emitter, carried by the body and configured to emit light toward a detection surface;
a photoelectric sensor, carried by the body and configured to be responsive to light from environment and/or light emitted by the light emitter;
an adjustable impedance unit, connected to the photoelectric sensor; and
a controller, configured to adjust the adjustable impedance unit to form at least two setting values with different impedances, and to be responsive to a sampling difference value of a sample value determined when the light emitter is in an ON state and a sample value determined when the light emitter is in an OFF state under each of the setting values, to prevent the mobile robot from performing an unexpected action due to erroneous determination.

2. The mobile robot according to claim 1, wherein the controller is provided with: an impedance adjustment port connected to the adjustable impedance unit, a signal sampling port connected between the photoelectric sensor and the adjustable impedance unit, and a signal control port connected to the light emitter; the controller is configured to:

adjust the adjustable impedance unit by controlling the impedance adjustment port to form the at least two setting values with different impedances;
turn on and turn off the light emitter through controlling the signal control port under each of the setting values;
acquire a turned-on sampling value and a turned-off sampling value through the signal sampling port when the light emitter is in the ON state and in the OFF state; and
be responsive to at least two sampling difference values determined for the at least two setting values to prevent the mobile robot from performing the unexpected action due to the erroneous determination, wherein the sampling difference value is a difference value between the turned-on sampling value and the turned-off sampling value.

3. The mobile robot according to claim 2, wherein the controller is configured to:
acquire a plurality of turned-on sampling values through the signal sampling port when the light emitter is in the ON state, and acquire an average turned-on sampling value based on the plurality of turned-on sampling values;
acquire a plurality of turned-off sampling values through the signal sampling port when the light emitter is in the OFF state, and acquire an average turned-off sampling value based on the plurality of turned-off sampling values, wherein the sampling difference value is a difference value between the average turned-on sampling value and the average turned-off sampling value.

4. The mobile robot according to claim 3, wherein the controller is configured to be responsive to a comparison result between the sampling difference value determined when the light emitter is in the ON state and the OFF state and preset data, such that the mobile robot is prevented from performing the unexpected action due to the erroneous determination.

5. The mobile robot according to claim 2, wherein the adjustable impedance unit comprises a first resistor and at least one second resistor, one ends of the first resistor and the second resistor are connected to the photoelectric sensor, another end of the first resistor is grounded or connected to the controller, and another end of the second resistor is connected to the controller.

6. The mobile robot according to claim 2, wherein the controller is configured to be responsive to a comparison result between the sampling difference value determined when the light emitter is in the ON state and the OFF state and preset data, such that the mobile robot is prevented from performing the unexpected action due to the erroneous determination.

7. The mobile robot according to claim 6, wherein the preset data comprises at least four sampling difference values acquired by placing the mobile robot in working environments provided with at least two different kinds of detection surfaces under each of the setting values.

8. The mobile robot according to claim 2, wherein the light emitter and the photoelectric sensor are arranged in pairs at a bottom of the body, and the light emitter is configured to emit light towards ground.

9. The mobile robot according to claim 2, wherein the light emitter and the photoelectric sensor are arranged in pairs at an outer periphery of the body, and the light emitter is configured to emit light towards a wall.

10. The mobile robot according to claim 1, wherein the light emitter is configured to emit infrared rays toward the detection surface, and the photoelectric sensor is responsive to infrared rays from environment and/or the infrared rays emitted by the light emitter.

11. The mobile robot according to claim 10, wherein the adjustable impedance unit comprises a first resistor and at least one second resistor, one ends of the first resistor and the second resistor are connected to the photoelectric sensor, another end of the first resistor is grounded or connected to the controller, and another end of the second resistor is connected to the controller.

12. The mobile robot according to claim 10, wherein the controller is configured to be responsive to a comparison result between the sampling difference value determined when the light emitter is in the ON state and the OFF state and preset data, such that the mobile robot is prevented from performing the unexpected action due to the erroneous determination.

13. The mobile robot according to claim 10, wherein the light emitter comprises an infrared emission tube, a PNP transistor, and a current-limiting resistor, wherein a collector of the PNP transistor is connected to an anode of the infrared emission tube, and a cathode of the infrared emission tube is grounded; an emitter of the PNP transistor is connected to a driving power supply via the current-limiting resistor; a base of the PNP transistor is connected to the controller.

14. The mobile robot according to claim 10, wherein the light emitter comprises an infrared emission tube, an NPN transistor, and a current-limiting resistor, wherein a collector of the NPN transistor is connected to a cathode of the infrared emission tube, and an anode of the infrared emission tube is connected to a driving power source via the current-limiting resistor; an emitter of the NPN transistor is grounded; a base of the NPN transistor is connected to the controller.

15. The mobile robot according to claim 1, wherein the adjustable impedance unit comprises a first resistor and at least one second resistor, one ends of the first resistor and the second resistor are connected to the photoelectric sensor, another end of the first resistor is grounded or connected to the controller, and another end of the second resistor is connected to the controller.

16. The mobile robot according to claim 3, wherein the adjustable impedance unit comprises a first resistor and at least one second resistor, one ends of the first resistor and the second resistor are connected to the photoelectric sensor, another end of the first resistor is grounded or connected to the controller, and another end of the second resistor is connected to the controller.

17. The mobile robot according to claim 1, wherein the controller is configured to be responsive to a comparison result between the sampling difference value determined when the light emitter is in the ON state and the OFF state and preset data, such that the mobile robot is prevented from performing the unexpected action due to the erroneous determination.

18. The mobile robot according to claim 17, wherein the preset data comprises at least four sampling difference values acquired by placing the mobile robot in working environments provided with at least two different kinds of detection surfaces under each of the setting values.

19. The mobile robot according to claim 1, wherein the light emitter and the photoelectric sensor are arranged in pairs at a bottom of the body, and the light emitter is configured to emit light towards ground.

20. The mobile robot according to claim 1, wherein the light emitter and the photoelectric sensor are arranged in pairs at an outer periphery of the body, and the light emitter is configured to emit light towards a wall.

* * * * *